N. A. CHRISTENSEN.
ADJUSTABLE SHAFT COUPLING.
APPLICATION FILED JUNE 1, 1911.

1,195,940.

Patented Aug. 22, 1916.

Witnesses:
Fred Palm
Chas. L. Goss.

Inventor:
Niels A. Christensen
By Flanders Bottum Fawsett & Bottum
Attorneys.

UNITED STATES PATENT OFFICE.

NIELS A. CHRISTENSEN, OF MILWAUKEE, WISCONSIN.

ADJUSTABLE SHAFT-COUPLING.

1,195,940.  Specification of Letters Patent.  Patented Aug. 22, 1916.

Application filed June 1, 1911. Serial No. 630,629.

*To all whom it may concern:*

Be it known that I, NIELS A. CHRISTENSEN, a citizen of the Kingdom of Denmark, residing at Milwaukee, in the county of Milwaukee and State of Wisconsin, have invented certain new and useful Improvements in Adjustable Shaft-Couplings, of which the following is a specification, reference being had to the accompanying drawing, forming a part thereof.

This invention relates to means for coupling with a driving shaft or member, the armature shaft of a magneto or other driven shaft or member which requires angular adjustment relative to such driving shaft or member. Its main objects are to facilitate such adjustment, particularly in connection with a coupling of the Oldham type, which compensates for lack of axial alinement between the two shafts or members, and generally to improve the construction and operation of devices of this class.

It consists in the construction, arrangement and combination of parts as hereinafter particularly described and afterward defined in the appended claims.

In the accompanying drawing like characters designate the same parts in the several figures.

Figure 1:
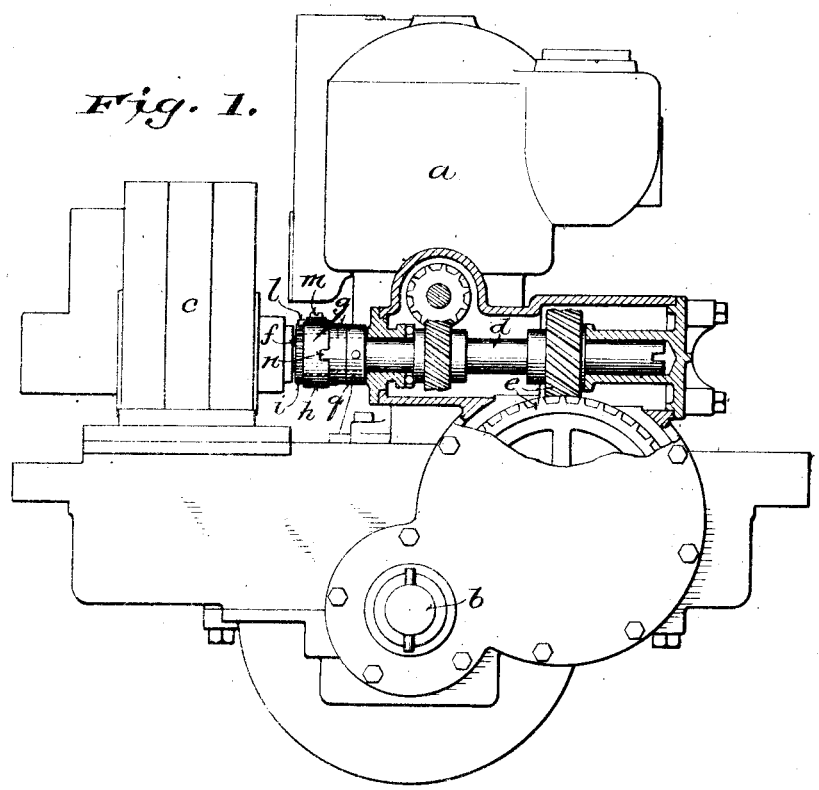
Figure 2:
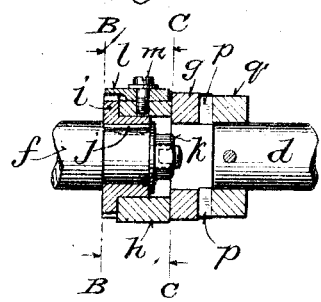
Figure 4:
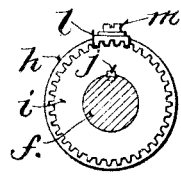
Figure 3:
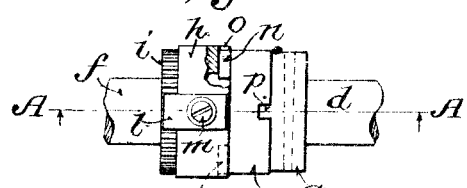
Figure 5:
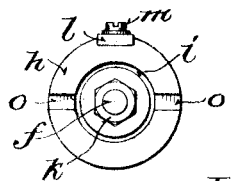

Figure 1 is an end elevation of an internal combustion engine with a magneto and magneto driving shaft to which a coupling embodying the invention is applied, certain parts of the casing being broken away; Fig. 2 is an axial section of the coupling on the line A, A, Fig. 3; Fig. 3 is a plan view or elevation thereof; Fig. 4 is a cross section on the line B, B, Fig. 2; and Fig. 5 is an end elevation of the adjustable coupling piece on a plane indicated by the line C, C, Fig. 2.

Referring to Fig. 1, by which for the purpose of illustration, the coupling in one of the preferred forms of its embodiment is shown in connection with the magneto of an internal combustion engine, *a* designates the cylinder, *b* the crank shaft and *c* the magneto of the engine. *d* designates the magneto driving shaft, which is arranged transversely to the crank shaft *b* and is driven therefrom through the cam shaft (not shown) and spiral gears *e*.

Referring to Figs. 2 and 3 in connection with Fig. 1, *f* designates the armature shaft of the magneto, the angular adjustment of which relative to the shaft or member by or from which it is driven, it is necessary or desirable to make or change with accuracy. It is mounted in approximate alinement with the driving shaft or member *d*, with which it is connected by a coupling of the Oldham type, to compensate for any inaccuracy in alinement of the connected members and to prevent binding and excessive wear.

The coupling comprises collars or coupling pieces *g* and *h*, formed or provided with loosely engaging cross tongues and grooves, rotatably connecting them with each other and with the driving shaft *d* so that while the driving and driven members may be more or less out of axial alinement, the collar or coupling piece *g* will slip transversely and permit each of them to rotate freely without binding in their bearings.

The driven shaft *f* is formed or provided with a circular series of teeth concentric with its axis and adjacent to one end thereof. In the present case these teeth are formed on the periphery of a collar *i* which is fastened on the shaft or member *f* by a key *j* and by a nut and washer *k*, as shown in Fig. 2.

Upon the hub of the toothed collar *i* the collar or coupling piece *h* is revolubly fitted and it is secured in adjusted position thereon by a toothed dog or clamp *l*, fitting into a longitudinal recess in the periphery of the collar *h*, in which it is fastened by a screw *m* in engagement with the teeth of the collar *i*.

The collar *g* is formed or provided on one side with cross tongues *n*, fitting into and loosely engaging corresponding grooves *o* in the adjoining face of the collar *h*. On the opposite side at right angles to the tongues *n*, the collar *g* is formed with grooves fitting and loosely engaging tongues *p* on the adjoining face of a collar *q*, which is fastened to the adjacent end of the driving shaft *d*. Obviously the tongues may be formed or provided on any of the connected parts and the grooves with which they engage in the adjoining part, and in place of forming or providing a tongue or groove on a collar *q* fastened on the shaft *d*, it may be formed on the shaft itself.

By loosening the screw *m* sufficiently to permit the disengagement of the dog or clamp *l* from the teeth of the collar *i*, the shaft *f* may be turned and its angular adjustment relative to the shaft *d* easily changed without disturbing other parts of the coupling or connected mechanism. When the desired adjustment has been made, the parts are secured in their adjusted relation to one another by tightening the screw m and thereby binding the dog or clamp l upon the teeth of collar i.

Various modifications in the details of construction and arrangement of the component parts of the device may be made without departure from the principle of the invention.

I claim:

1. The combination with rotary driving and driven members arranged in approximate alinement with each other, one of them being provided with a series of teeth concentric with its axis, of coupling pieces having loosely engaging cross tongues and grooves connecting them with each other and with the other member, one tongue and groove connection being transverse to the other and one of said coupling pieces being mounted and capable of angular adjustment on the toothed member, and a clamping piece adapted to be fastened to the angularly adjustable coupling piece in engagement with the toothed member.

2. The combination with rotary driving and driven members arranged in approximate axial alinement with each other, of a toothed collar fixed on one of said members, coupling pieces having loosely engaging cross tongues and grooves connecting them with each other and with the other member, one tongue and groove connection being transverse to the other and one of said coupling pieces being mounted and capable of angular adjustment on said toothed collar and having a longitudinal recess in its periphery, a toothed dog removably fitted in the peripheral recess of the angularly adjustable coupling piece, and a screw detachably securing the dog in the recess of said adjustable coupling piece, the dog being adapted when so secured, to engage with said toothed collar for holding said connected parts in the desired adjusted angular relation to each other.

In witness whereof I hereto affix my signature in presence of two witnesses.

NIELS A. CHRISTENSEN.

Witnesses:
E. RITTNER,
J. S. JOHNSTON.